United States Patent
Kimura

[19]

[11] Patent Number: 6,058,312

[45] Date of Patent: May 2, 2000

[54] AUTOMATIC SELECTING APPARATUS FOR AN OPTIMUM WIRELESS COMMUNICATION ROUTE

[75] Inventor: Yoshinobu Kimura, Nara, Japan

[73] Assignee: Sharp Kabushiki Kaisha, Osaka, Japan

[21] Appl. No.: 08/764,261

[22] Filed: Dec. 12, 1996

[30] Foreign Application Priority Data

Dec. 21, 1995 [JP] Japan ................................. 7-333202

[51] Int. Cl.[7] .............................. H04Q 7/32; H04Q 7/20
[52] U.S. Cl. ....................... 455/445; 455/414; 455/422; 455/412; 455/417
[58] Field of Search ................................ 455/445, 414, 455/417, 560, 422, 403, 418, 412; 379/210, 211, 212, 111, 112, 113, 114

[56] References Cited

U.S. PATENT DOCUMENTS

| | | | |
|---|---|---|---|
| 5,764,741 | 6/1998 | Barak | 379/112 |
| 5,781,625 | 7/1998 | Sizer, II | 379/114 |

FOREIGN PATENT DOCUMENTS

| | | |
|---|---|---|
| 1180172 | 7/1989 | Japan . |
| 294754 | 4/1990 | Japan . |
| 6113042 | 4/1994 | Japan . |

*Primary Examiner*—Wellington Chin
*Assistant Examiner*—Keith Ferguson

[57] ABSTRACT

A communication scheme storing section stores a communication route selecting scheme designated from an input section and communication information such as communication history, charge system and a correlation between an electric field intensity and a data communication error rate of each wireless communication system. A communication route selection control section 10 decides a wireless communication route to be used by referring to the communication information stored in the communication scheme storing section according to the communication route selecting scheme stored in the communication scheme storing section, and turns on a communication switch corresponding to the above decided wireless communication route among communication switches. Thus, according to the communication route selecting scheme designated by the user, the optimum wireless communication route corresponding to the wireless communication infrastructure characteristics is automatically selected.

20 Claims, 13 Drawing Sheets

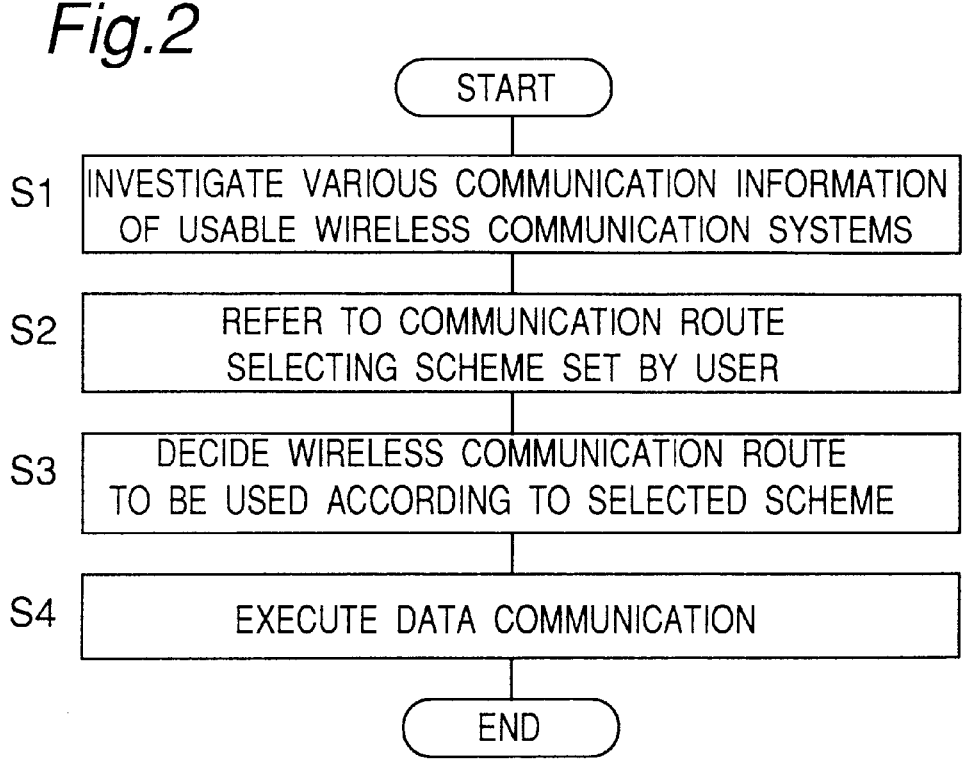
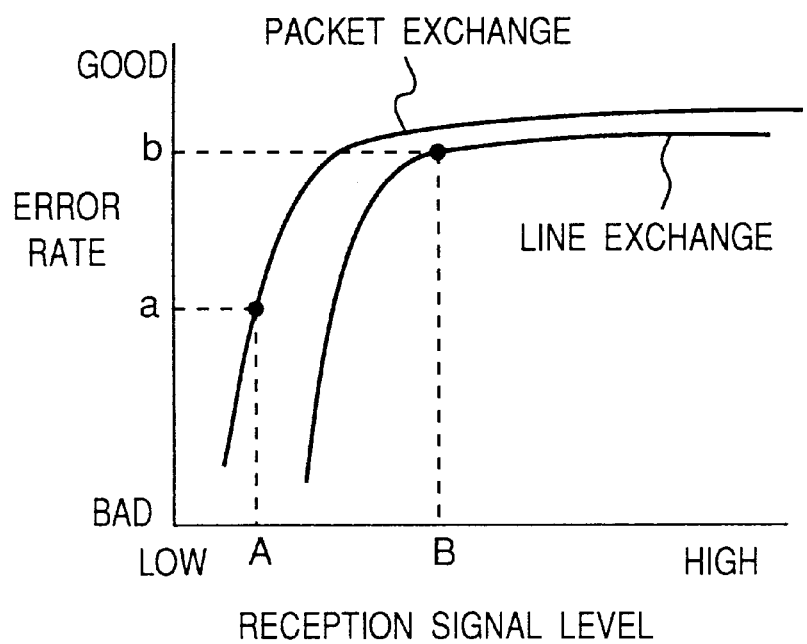

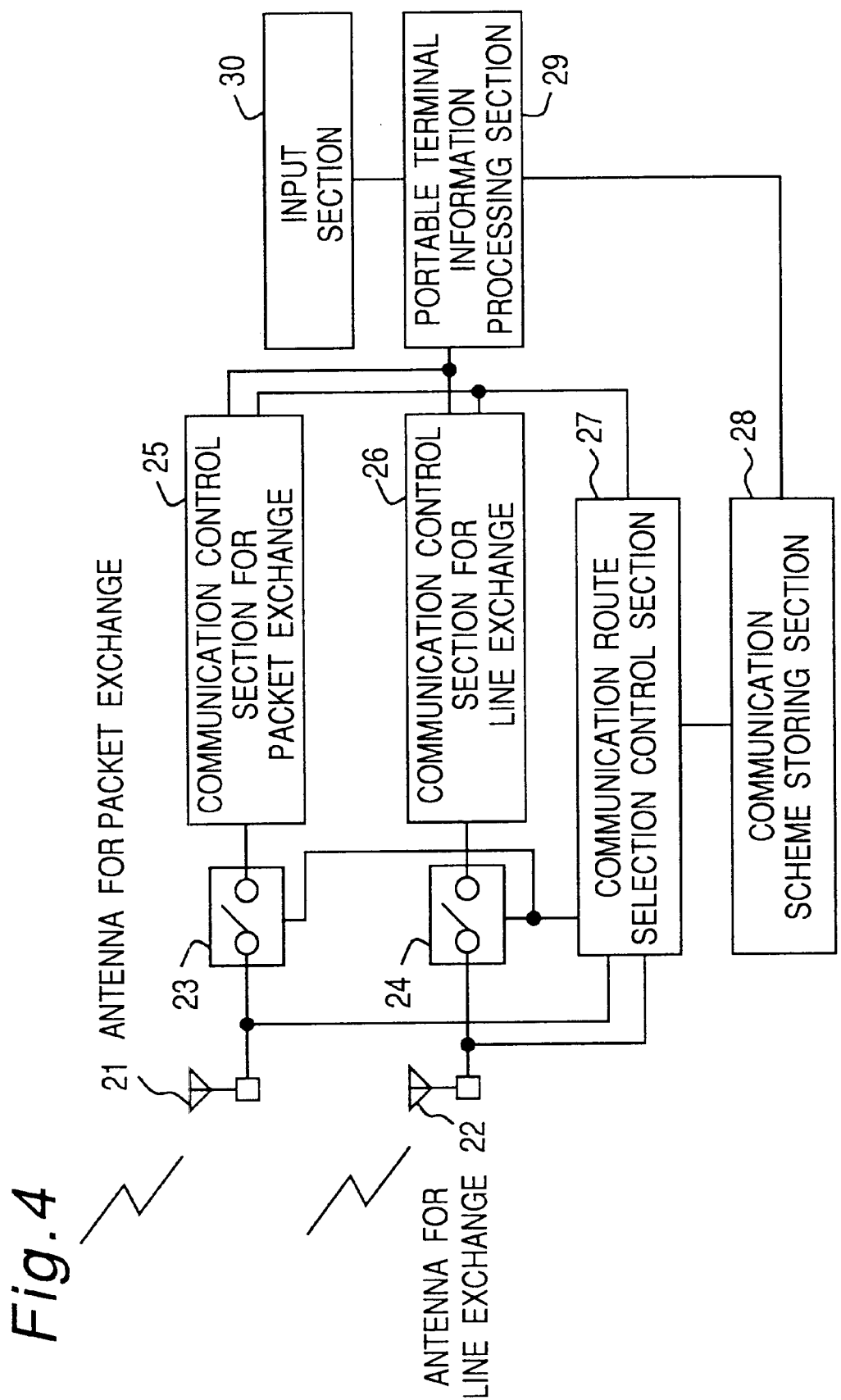

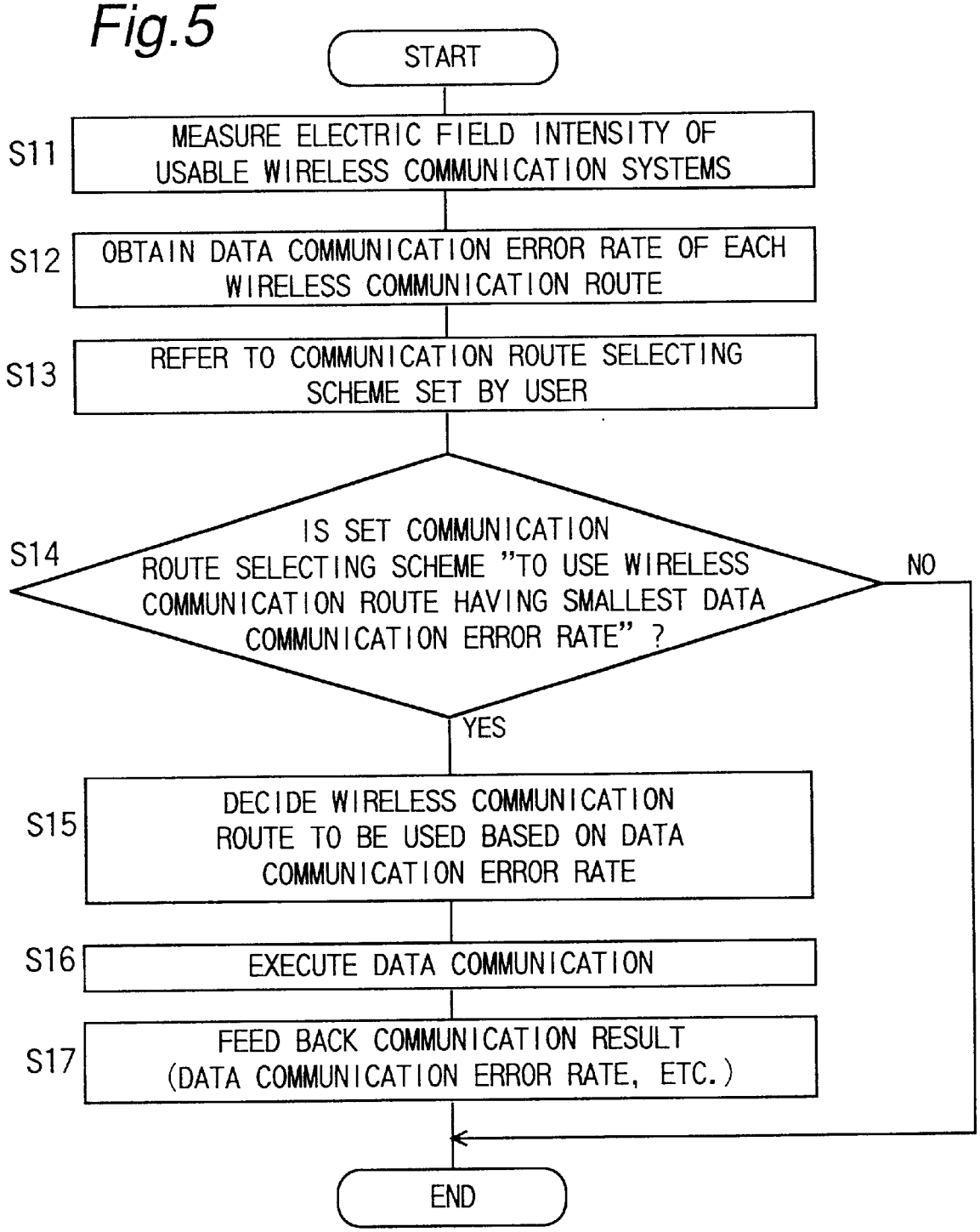

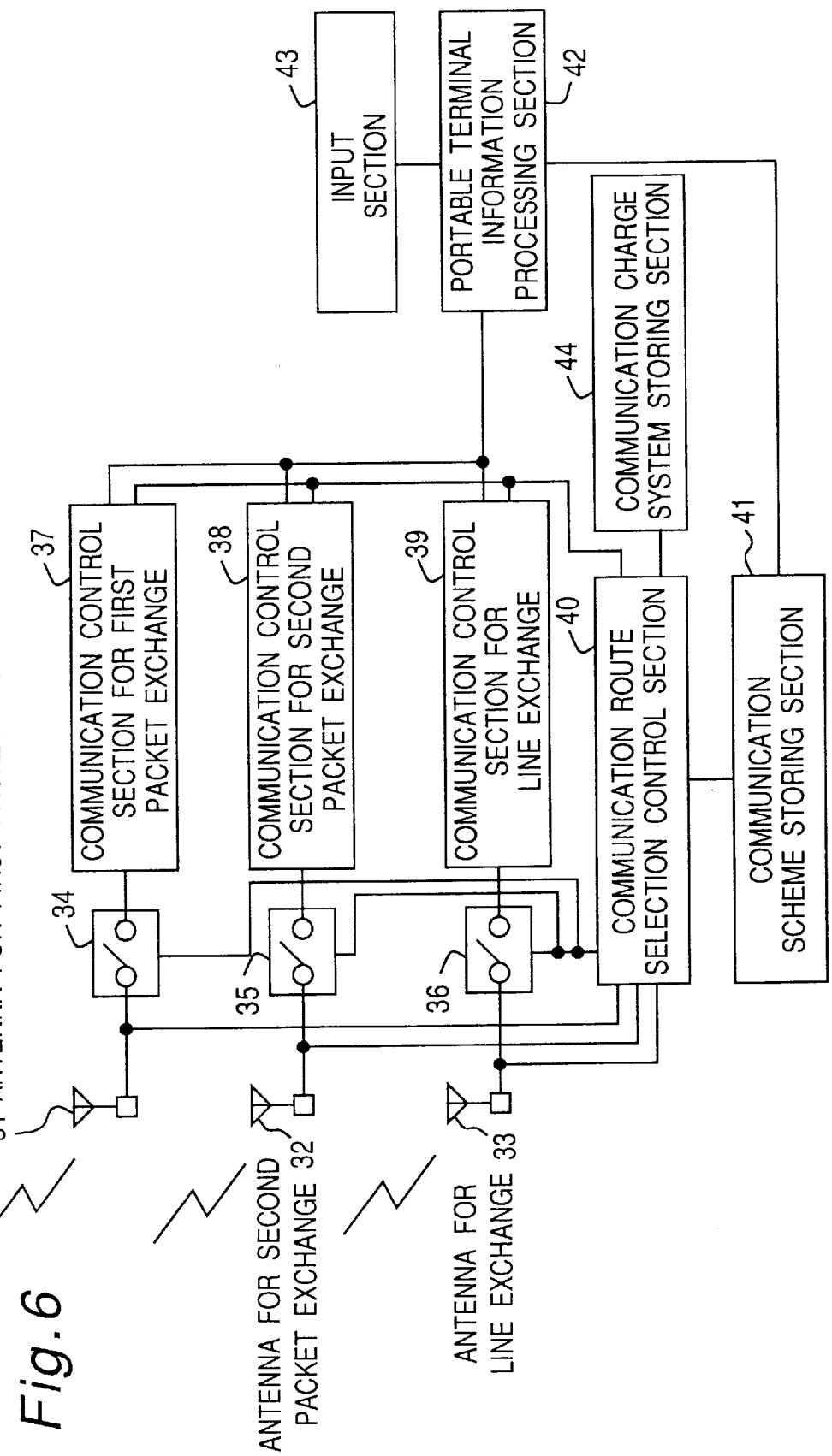

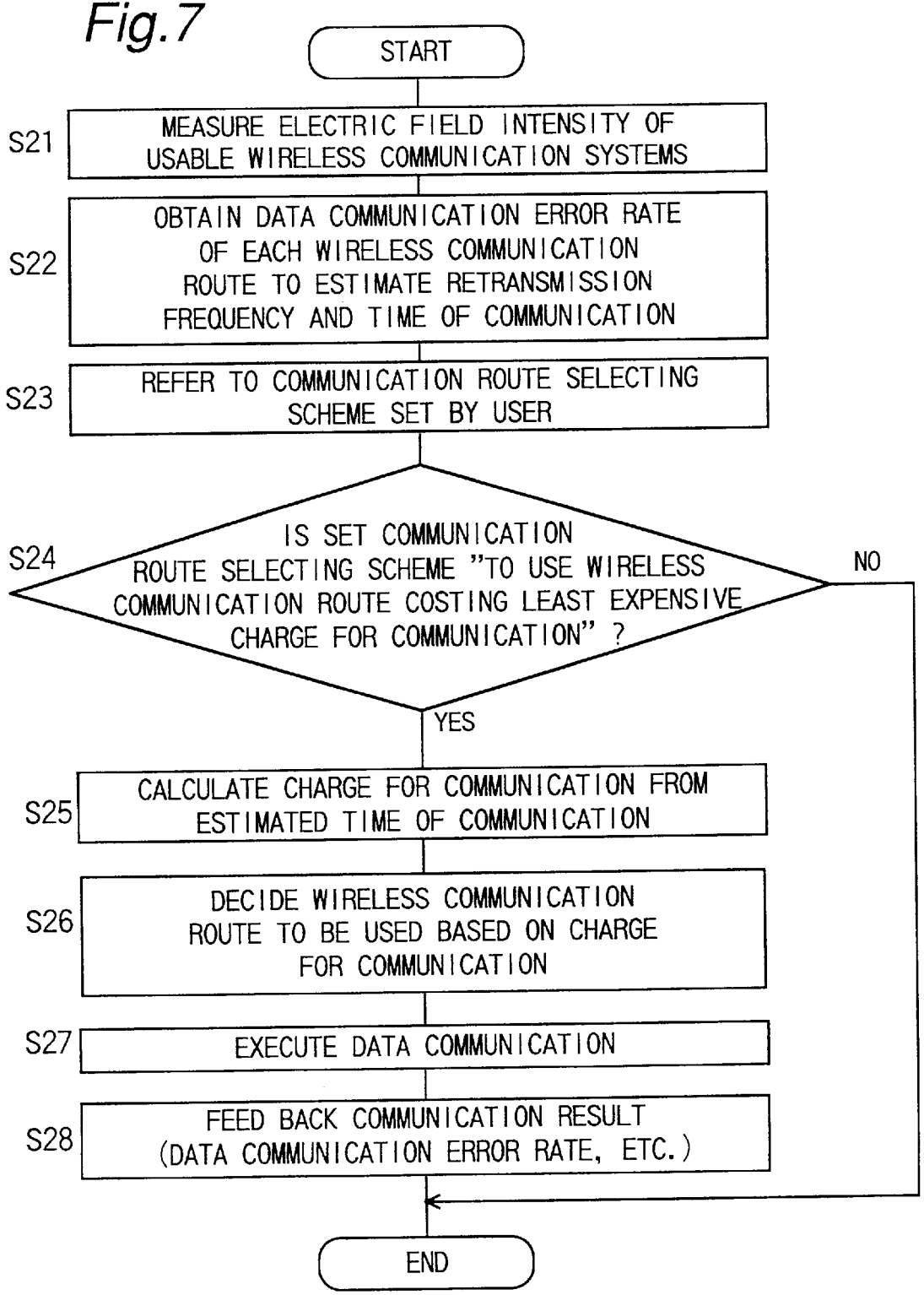

Fig.8

| | | DATA COMMUNICATION ERROR RATE | | |
|---|---|---|---|---|
| | | FIRST PACKET EXCHANGE | SECOND PACKET EXCHANGE | LINE EXCHANGE |
| S/N RATIO (dB) | 1 | 0.1 | 0.5 | 0.3 |
| | 2 | 0.07 | 0.3 | 0.1 |
| | 3 | 0.05 | 0.1 | 0.07 |
| | 4 | 0.01 | 0.07 | 0.05 |
| | 5 | 0.008 | 0.05 | 0.01 |
| | 6 | 0.006 | 0.01 | 0.008 |
| | 7 | 0.001 | 0.009 | 0.006 |
| | 8 | 0.0008 | 0.008 | 0.001 |
| | 9 | 0.0001 | 0.006 | 0.0008 |
| | 10 | 0.00001 | 0.001 | 0.0001 |
| | 11 | 0.000001 | 0.0000001 | 0.00001 |
| | 12 | 0.0000001 | 0.00000001 | 0.000001 |

Fig.9

| COMMUNICATION AREA | DAYTIME (8:00—19:00) | NIGHTTIME (19:00—23:00) | MIDNIGHT AND EARLY MORNING (23:00—8:00) |
|---|---|---|---|
| WITHIN 100km | 8 yens/kilobyte | 6 yens/kilobyte | 4 yens/kilobyte |
| BEYOND 100km | 12 yens/kilobyte | 8 yens/kilobyte | 6 yens/kilobyte |

Fig.10

| DATA AMOUNT | UNIT COST | CHARGE PER MONTH |
|---|---|---|
| LESS THAN 500 kilobytes | — | 5,000 yens |
| NOT LESS THAN 500 kilobytes | 8 yens/kilobyte | 5,000 yens + $\alpha$ |

Fig. 11

| COMMUNICATION AREA | DAYTIME (8:00—19:00) | NIGHTTIME (19:00—23:00) | MIDNIGHT AND EARLY MORNING (23:00—8:00) |
|---|---|---|---|
| SERVICE PROVIDING AREA | 10.5 seconds/10 yens | 19 seconds/10 yens | 21 seconds/10 yens |
| OUTSIDE SERVICE PROVIDING AREA WITHIN 160 km | 8 seconds/10 yens | 14.5 seconds/10 yens | 16 seconds/10 yens |
| OUTSIDE SERVICE PROVIDING AREA BEYOND 160 km | 6.5 seconds/10 yens | 12 seconds/10 yens | 13 seconds/10 yens |

AUTOMATIC SELECTING APPARATUS FOR AN OPTIMUM WIRELESS COMMUNICATION ROUTE

BACKGROUND OF THE INVENTION

1. Field of the Invention

The present invention relates to an automatic selecting apparatus for an optimum wireless communication route capable of automatically selecting an optimum communication route according to a purpose out of a plurality of wireless communication routes in a portable terminal which can utilize a plurality of wireless communication infrastructure (referred to merely as an infrastructure hereinafter) having different characteristics.

2. Description of the Background Art

In the field of wired communication using a public line, there is an LCR (Least Cost Routing) function as a known technique (Japanese Patent Laid-Open Publication Nos. HEI 1-180172, HEI 2-94754 and HEI 6-113042). The LCR function is the function of automatically selecting a line that can be used at the least cost when an operator estimates and inputs the place, day of the week time and line connection time of communication with the other party in using a telephone among the proposed carriers of DDI, Teleway Japan and Japan Telecom inclusive of the NTT line.

However, portable telephones and the like of wireless communication systems do not have the LCR function because each terminal can join only one cellular carrier.

Also, in the future, it is highly possible that not only the wireless line exchange system used in each cellular carrier but also the infrastructure of the wireless packet exchange system such as a tele-terminal will be popularized though the service area of the latter is narrow yet currently.

It is suspected that the portable terminals of wireless communication systems have several problems as follows.

First, in a portable terminal capable of using a plurality of infrastructures having different characteristics through wireless line exchange and wireless packet exchange that are expected to appear in future, it is presumably difficult for each user to decide which infrastructure should be used at an arbitrary point of time. It is considered that the optimum infrastructure may change depending on the purpose of use of each user, and therefore, the above difficulty further increases.

Secondly, in a data communication using a cable, it is often that the state of an electric signal is always constant and in good conditions between terminals which exchange communications. Therefore, it is scarcely required to consider the signal intensity, and the possible occurrence of data communication error depending on the signal intensity is ignorably little. In contrast to the above, in a data communication using a wireless route, the electric field intensity extremely varies to vary the communication error, and therefore, it is very difficult to estimate the communication error.

Thirdly, in regard to the LCR function in wired communication, the charge for communication is uniquely decided when the communication route, the destination party to be connected and the time of communication are decided. Therefore, it is relatively easy to select the communication route that costs the least expensive charge for communication. In contrast to the above, in the case of wireless communication, the distance from the base station to the wireless terminal and the communication conditions of the wireless communication route are not fixed. Therefore, the charge for communication is not uniquely decided even when the communication route, the destination party to be connected and the time of communication are decided.

Fourthly, in the case of data communication using a cable, there is relatively less data communication error. Therefore, assuming that a plurality of communication routes are used, it is considered that the shortness of the time of communication is approximately proportional to the magnitude of the transfer rate of the communication route. However, it is considered that the data communication error occurs frequently in the case of the data communication using a wireless route. Then, how to process the data communication error depends on the wireless communication system to be used, and for the above process are availed a system for retransmitting the portion in which an error has occurred and a system for additionally transmitting data necessary for error correction in the data communication stage and correcting the error at the receiving end when an error is detected. Therefore, in the case of the data communication using a wireless route, the shortness of the time of communication is not always proportional to the magnitude of the transfer rate in contrast to the case of the wired communication, and this means that the selection of the communication route for achieving the fastest data communication is difficult.

SUMMARY OF THE INVENTION

The object of the present invention is therefore to provide an automatic selecting apparatus for an optimum wireless communication route capable of automatically selecting the optimum wireless communication route according to the user's purpose and the wireless communication infrastructure by estimating the data communication error rate, charge for communication and the time of communication including error correction of each wireless communication route.

In order to achieve the aforementioned object, there is provided an automatic selecting apparatus for an optimum wireless communication route comprising:

a communication control section for executing data communication by way of each wireless communication route;

a communication information storing section for storing communication information concerning the wireless communication routes;

a scheme designating section for designating a communication route selecting scheme;

a scheme storing section for storing a communication route selecting scheme designated by the scheme designating section; and a communication route selection control section for selecting an optimum wireless communication route conforming to the communication route selecting scheme referring to the communication information of the wireless communication routes stored in the communication information storing section based on the communication route selecting scheme stored in the scheme storing section to thereby operate a communication control section corresponding to the selected wireless communication route.

When executing data communication in the above construction, the communication route selection control section refers to the communication information of each wireless communication route stored in the communication information storing section based on the communication route selecting scheme that has been designated by the scheme designating section and stored in the scheme storing section to select the optimum wireless communication route conforming to the above designated communication route selecting scheme. Then, the communication control section corresponding to the selected wireless communication route is operated to start the data communication by way of the wireless communication route conforming to the communication route selecting scheme designated by the user.

According to an embodiment of this invention, the communication information storing section stores a correlation between reception signal intensity information and a data communication error rate as one of the communication information, and the communication route selection control section comprises:

an intensity information detector for detecting reception signal intensity information of each wireless communication route based on a reception signal from each wireless communication route; and an error rate calculator for obtaining a data communication error rate of each wireless communication route based on the reception signal intensity information of each wireless communication route detected by the intensity information detector and the correlation, and wherein when the communication route selecting scheme stored in the scheme storing section is "to use a wireless communication route having the smallest data communication error rate", the apparatus selects the wireless communication route having the smallest data communication error rate obtained by the error rate calculator as the optimum wireless communication route.

In the above construction, the communication route selection control section detects the reception signal intensity information for each wireless communication route by the intensity information detector and obtains a data communication error rate of each wireless communication route by the error rate calculator based on the detected reception signal intensity information. Then, the obtained wireless communication route having the minimum data communication error rate is selected as the optimum wireless communication route.

With the above arrangement, the data communication is executed by way of the optimum wireless communication route conforming to the communication route selecting scheme "to select the wireless communication route having the smallest data communication error rate" designated by the user.

According to an embodiment of this invention, the communication information storing section stores a correlation between reception signal intensity information and a data communication error rate as one of the communication information, and the communication route selection control section comprises:

an intensity information detector for detecting reception signal intensity information of each wireless communication route based on a reception signal from each wireless communication route; and a communication time estimator for estimating an actual time of communication including error correction of each wireless communication route referring to the communication information by means of the data communication error rate of each wireless communication route based on the reception signal intensity information of each wireless communication route detected by the intensity information detector means and the correlation, and wherein when the communication route selecting scheme stored in the scheme storing section is "to use a wireless communication route requiring a shortest time of communication", the apparatus selects the wireless communication route requiring the shortest time of communication estimated by the communication time estimator as the optimum wireless communication route.

In the above construction, the communication route selection control section detects the reception signal intensity information for each wireless communication route by the intensity information detector and estimates the actual time of communication of each wireless communication route by the communication time estimator using the data communication error rate of each wireless communication route based on the detected reception signal intensity information. Then, the wireless communication route requiring the shortest time of communication is selected as the optimum wireless communication route.

With the above arrangement, the data communication is executed by way of the optimum wireless communication route conforming to the communication route selecting scheme "to select the wireless communication route requiring the shortest time of communication" designated by the user.

According to an embodiment of this invention, the communication information storing section stores a correlation between reception signal intensity information and a data communication error rate and a charge system of each wireless communication system as the communication information, and the communication route selection control section comprises:

an intensity information detector for detecting reception signal intensity information of each wireless communication route based on a reception signal from each wireless communication route;

an estimator for estimating either one of an actual communication data amount and an actual time of communication including error correction of each wireless communication route referring to the communication information by means of the data communication error rate of each wireless communication route based on the reception signal intensity information of each wireless communication route detected by the intensity information detector and the correlation; and a communication charge calculator for calculating a charge for communication of each wireless communication route based on the communication data amount or the time of communication estimated by the estimator and the charge system, and wherein when the communication route selecting scheme stored in the scheme storing section is "to use a wireless communication route costing a least expensive charge for communication", the apparatus selects the wireless communication route costing the least expensive charge for communication calculated by the communication charge calculator as the optimum wireless communication route.

In the above construction, the communication route selection control section detects the reception signal intensity information for each wireless communication route by the intensity information detector, estimates either the actual communication data amount or the actual time of communication for each wireless communication route by the estimator using the data communication error rate of each wireless communication route based on the detected reception signal intensity information, and obtains the charge for communication of each wireless communication route by the communication charge calculator based on the estimated actual communication data amount or the actual time of communication. Then, the wireless communication route costing the least expensive charge for communication is selected as the optimum wireless communication route.

With the above arrangement, the data communication is executed by way of the optimum wireless communication route conforming to the communication route selecting scheme "to select the wireless communication route costing the least expensive charge for communication" designated by the user.

According to an embodiment of the invention, there is provided an automatic selecting apparatus for an optimum wireless communication route further comprising:

an information processing section for obtaining an actual data communication error rate of a wireless communication route having executed data communication based on a communication result from a communication control section having executed data communication, and updating the correlation between the reception signal intensity information and the data communication error rate stored in the communication information storing section according to the obtained actual data communication error rate.

According to the above construction, the information processing section obtains the actual data communication error rate of the wireless communication route that has executed the data communication and updates the correlation between the reception signal intensity information and the data communication error rate stored in the communication information storing section. Thus, when the correlation between the reception signal intensity information and the data communication error rate stored preparatorily in the communication information storing section is not conforming to the actual communication environment, the correlation is corrected to be the correlation between the reception signal intensity information and the data communication error rate conforming to the actual communication environment, so that the data communication error rate is obtained correctly.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a flowchart of an automatic communication route selecting operation to be executed by a communication route selection control section, communication control sections for first through x-th communication routes and a portable terminal information processing section as shown in FIG. 1;

FIG. 3 is a graph showing an example of a correlation between an electric field intensity and a data communication error rate in packet exchange and line exchange;

FIG. 4 is a block diagram showing a concrete example of the automatic selecting apparatus for an optimum wireless communication route shown in FIG. 1;

FIG. 5 is a flowchart of an automatic communication route selecting operation to be executed by a communication route selection control section, a communication control section for packet exchange, a communication control section for line exchange and a portable terminal information processing section as shown in FIG. 4;

FIG. 6 is a block diagram showing a concrete example different from the one shown in FIG. 4;

FIG. 7 is a flowchart of an automatic communication route selecting operation to be executed by a communication route selection control section, a communication control section for first packet exchange, a communication control section for second packet exchange, a communication control section for line exchange and a portable terminal information processing section as shown in FIG. 6;

FIG. 8 is a chart showing an example of a correlation between the signal-to-noise ratio of a reception signal and a data communication error rate in first packet exchange, second packet exchange and line exchange;

FIG. 9 is a chart showing an example of a communication charge system of the first packet exchange;

FIG. 10 is a chart showing an example of a communication charge system of the second packet exchange;

FIG. 11 is a chart showing an example of a communication charge system of the line exchange;

DETAILED DESCRIPTION OF THE PREFERRED EMBODIMENTS

The present invention will be described in detail below based on its embodiments with reference to the accompanying drawings.

Figure 1:
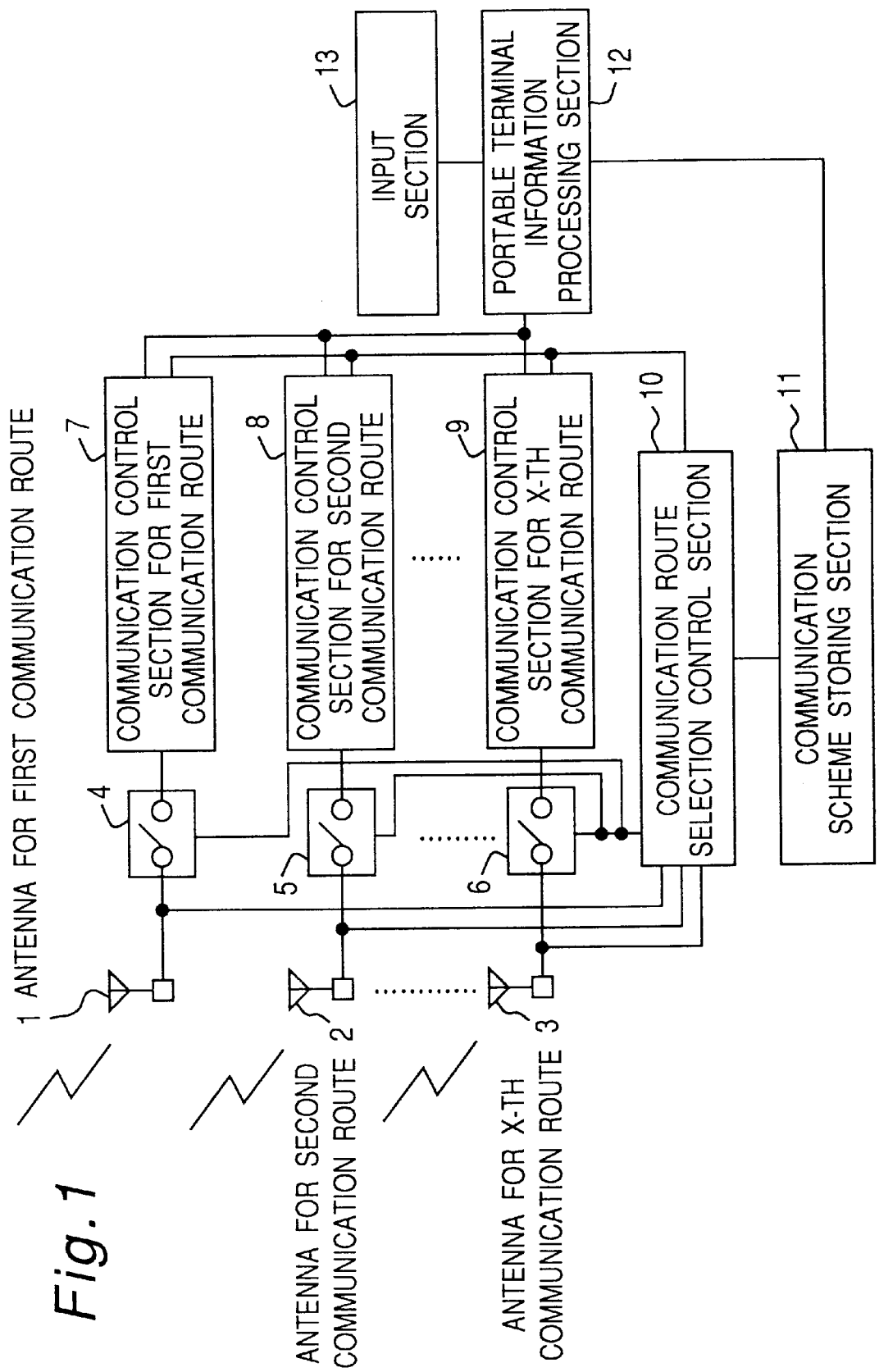
FIG. 1 is a block diagram showing an automatic selecting apparatus for an optimum wireless communication route of the present invention.

FIG. 1 is a block diagram of an automatic selecting apparatus for an optimum wireless communication route of the present embodiment. It is to be noted that this automatic selecting apparatus for an optimum wireless communication route can be applied to a plurality of wireless communication systems.

The present apparatus has a first communication route antenna 1 for first communication route, and this first communication route antenna 1 is connected via a first communication route switch 4 to a communication control section 7 for first communication route. Likewise, the present apparatus has second through x-th communication route antennas 2 and 3, second through x-th communication route switches 5 and 6 and second through x-th communication route communication control sections 8 and 9 for its second through x-th wireless communication routes respectively.

A communication route selection control section 10 is always connected to antennas 1 through 3 for each communication route and receives signals from them to obtain the electric field intensities of each wireless communication route. Then, the control section decides a wireless communication route to be used referring to the user's communication route selecting scheme and communication information stored in a communication scheme storing section 11 and turns on a communication route switch corresponding to the above decision among the communication route switches 4 through 6. Then, the communication control section connected to the communication route switch turned on among the communication control sections 7 through 9 executes data communication by way of the corresponding wireless communication route. Further, the communication information obtained through the above operation is transmitted to a portable terminal information processing section 12.

The portable terminal information processing section 12 updates the communication information stored in the communication scheme storing section 11 based on the communication information from the communication control section that has executed the data communication among the communication control sections 7 through 9.

From an input section 13 are inputted the user's communication route selecting scheme to be stored into the communication scheme storing section 11, commands and the like to the portable terminal information processing section 12.

FIG. 2 is a flowchart of an automatic communication route selecting operation executed under the control of the communication route selection control section 10 and the communication control sections 7 through 9. The automatic communication route selecting operation will be described below with reference to FIG. 2.

In step S1, electric field intensities of the first through x-th wireless communication routes are obtained by the communication route selection control section 10 based on the signals from the antennas 1 through 3 for each communication route. Further, the communication information of the communication history and the charge system of each wireless communication system, a correlation between the electric field intensity and the data communication error rate and the like of each wireless communication system stored in the communication scheme storing section 11 are investigated.

In the present case, the correlation between the electric field intensity and the data communication error rate of each wireless communication system is such a relation as shown in FIG. 3 obtained based on data measured through experiments. It is to be noted that the wireless communication systems shown in FIG. 3 are the two systems of packet exchange and line exchange.

In step S2, the communication route selection control section 10 refers to the communication route selecting scheme that has been inputted by the user from the input section 13 and stored in the communication scheme storing section 11.

In step S3, the communication route selection control section 10 decides a wireless communication route to be used based on the communication information investigated in step S1 according to the communication route selecting scheme referred to in step S2. Then, the communication route switch corresponding to the above decision among the communication route switches 4 through 6 is turned on.

In the present case, all of the obtained electric field intensities and the investigated communication information in step S1 are not always referred to, but only the communication information corresponding to the communication route selecting scheme designated by the user is referred to.

For example, when the communication route selecting scheme designated by the user is "to use the wireless communication route having the most intense electric field intensity", the electric field intensities obtained from the antennas 1 through 3 for each communication route are referred to, while neither one of the other communication information such as the communication history, the charge system and the correlation between the electric field intensity and the data communication error rate is not referred to. When the communication route selecting scheme designated by the user is "to use the wireless communication route that has been used most lately", the communication history of each wireless communication system is referred to regardless of the electric field intensities obtained from the antennas 1 through 3 for each communication route.

In step S4, data communication is executed by way of the above decided wireless communication route by the communication control section connected to the communication route switch turned on in step S3 among the communication control sections 7 through 9. Subsequently, the automatic communication route selecting operation is completed.

Thus, according to the present embodiment, the communication route selecting scheme designated from the input section 13, and the communication history and charge system of each wireless communication system, the correlation between the electric field intensity and the data communication error rate of each wireless communication system and the like are stored in the communication scheme storing section 11. Then, according to the communication route selecting scheme stored in the communication scheme storing section 11, the communication route selection control section 10 decides the wireless communication route referring to the communication information stored in the communication scheme storing section 11 and turns on the corresponding communication route switch among the communication route switches 4 through 6. Thus, the data communication is executed by way of the corresponding wireless communication route by the communication control section among 7 through 9 connected to the switch turned on.

Therefore, according to the communication route selecting scheme designated by the user, the optimum wireless communication route corresponding to the wireless communication infrastructure characteristics can be automatically selected.

The automatic selecting apparatus for an optimum wireless communication route of the above embodiment will be described below based on its more concrete examples.

FIG. 4 is a block diagram of the automatic selecting apparatus for an optimum wireless communication route of the present embodiment. It is to be noted that the present automatic selecting apparatus can be applied to the two wireless communication systems of packet exchange and line exchange.

That is, the apparatus has an antenna 21 for packet exchange and an antenna 22 for line exchange as communication route antennas. The antenna 21 for packet exchange is connected to a packet exchange communication control section 25 via a switch 23 for packet exchange. Likewise, the antenna 22 for line exchange is connected to a line exchange communication control section 26 via a switch 24 for line exchange.

A communication route selection control section 27 receives signals from antennas 21 and 22 for each exchange to obtain the electric field intensities of the packet exchange and line exchange. Then, the control section decides a wireless communication route to be used referring to the user's communication route selecting scheme and the communication information stored in a communication scheme storing section 28, and turns on either one of the switch 23 for packet exchange or the switch 24 for line exchange according to the decision. The communication control section connected to the communication route switch turned on out of the communication control sections 25 and 26 for respective packet and line exchange executes data communication by way of the corresponding wireless communication route. Then, the communication result obtained through the above operation is transmitted to a portable terminal information processing section 29.

The portable terminal information processing section 29 stores and updates the communication information and communication scheme in the communication scheme storing section 28 based on the communication result from the communication control section that has executed the data communication out of each communication control section 25 and 26 as well as the user's communication scheme from an input section 30.

From the input section 30 are inputted the user's communication scheme to be stored in the communication scheme storing section 28, commands to the portable terminal information processing section 29 and the like.

According to the line exchange that is one applicable wireless communication system of the present embodiment, once a line is connected, the line is monetarily charged in time units until the line will be disconnected. On the other hand, according to the packet exchange, data is divided into blocks each of which is called a packet and has a length smaller than a specified length, and each packet is stored in the exchange of the communication infrastructure with destination information attached thereto to be transferred when the line of the other party is unoccupied. Thus, the line is occupied only when data exchange is actually performed according to the packet exchange, and therefore, it can be considered that the charge for communication is possibly allowed to be much less than that of the line exchange depending on the purpose of use.

Furthermore, according to the packet exchange, any packet damaged due to deteriorated communication route conditions is discarded in the exchanger, and a request for retransmission is issued to the terminal unit shown wholly in FIG. 4. Therefore, when the communication route conditions are deteriorated, the retransmission of packets frequently occurs, consequently causing a defect that the above advantage of the packet exchange is possibly impaired.

Therefore, according to the present embodiment, the correlation between the electric field intensity and the data communication error rate is stored for each wireless communication route as one of the communication informations to be stored in the communication scheme storing section 28. Then, the electric field intensities of the packet exchange and the line exchange at the time of starting data communication are measured by the communication route selection control section 27, and the wireless communication route by way of which the data communication is executed is decided as follows based on the result of measurement.

It is postulated that the correlation between the electric field intensity and the data communication error rate of each wireless communication route stored in the communication scheme storing section 28 is as shown in FIG. 3. Assuming that the packet exchange has a reception signal level A and the line exchange has a reception signal level B at a point of time, the data communication error rate of the packet exchange is "a" and the data communication error rate of the line exchange is "b" at the point of time from FIG. 3. Therefore, the communication route selection control section 27 decides that the line exchange has better communication route conditions. Consequently, the switch 24 for line exchange is turned on.

FIG. 5 is a flowchart of an automatic communication route selecting operation to be executed under the control of the communication route selection control section 27, the communication control sections 25 and 26 for respective packet and line exchange and the portable terminal information processing section 29. The automatic communication route selecting operation of the present embodiment will be described below with reference to FIG. 5.

In step S11, electric field intensities of the packet exchange and the line exchange are obtained by the communication route selection control section 27 based on signals from the antennas 21 and 22 for respective packet and line exchange.

In step S12, the communication route selection control section 27 investigates the communication information of the correlation between the electric field intensity and the data communication error rate and the like of each wireless communication system stored in the communication scheme storing section 28. Then, the data communication error rate is obtained for each of the packet exchange and the line exchange.

In step S13, the communication route selection control section 27 refers to the communication route selecting scheme that has been inputted by the user from the input section 30 and stored in the communication scheme storing section 28.

In step S14, the communication route selection control section 27 decides whether or not the communication route selecting scheme stored in the communication scheme storing section 28 is "to use the wireless communication route having the lowest data communication error rate". When the scheme is "to use the wireless communication route having the lowest data communication error rate" as a result, the program flow proceeds to step S15. Otherwise, the automatic communication route selecting operation is completed.

In step S15, the communication route selection control section 27 decides that the one having the lower data communication error rate out of the packet exchange and the line exchange is the wireless communication route to be used based on the data communication error rate obtained in step S12 according to the scheme "to use the wireless communication route having the lowest data communication error rate" referred to in step S13.

Then, the communication route switch corresponding to the wireless communication route to be used out of the switches 23 and 24 for respective packet and line exchange is turned on.

In step S16, data communication is executed by way of the wireless communication route decided in step S15 by the communication control section connected to the communication route switch turned on out of the control sections 25 and 26.

In step S17, the portable terminal information processing section 29 corrects the communication information of the correlation between the electric field intensity and the data communication error rate and the like stored in the communication scheme storing section 28 based on a communication result such as the number of retransmission packet transmitted from the communication control section that is executing the data communication out of the control sections 25 and 26.

Subsequently, the automatic communication route selecting operation is completed.

Thus, according to the present embodiment, the communication scheme storing section 28 stores the communication information of the communication route selecting scheme designated from the input section 30, the correlation between the electric field intensity and the data communication error rate of the packet exchange and the line exchange and the like. Then, the communication route selection control section 27 decides the wireless communication route having the lower data communication error rate out of the packet exchange and the line exchange referring to the correlation between the electric field intensity and the data communication error rate of each wireless communication route stored in the communication scheme storing section 28 according to the communication route selecting scheme "to use the wireless communication route having the lowest data communication error rate" stored in the communication scheme storing section 28. Then, the data communication is executed by way of the corresponding wireless communication route by the communication control section corresponding to the wireless communication route to be used out of the control sections 25 and 26.

Therefore, by watching the communication route conditions of the packet exchange and the line exchange by the electric field intensity, when the communication route selecting scheme designated by the user is "to use the wireless communication route having the lowest data communication error rate", the data communication error rate is estimated to allow the optimum wireless communication route to be automatically selected.

The automatic selecting apparatus for an optimum wireless communication route of the present invention will be described below based on an embodiment different from the above embodiment.

FIG. 6 is a block diagram of an automatic selecting apparatus for an optimum wireless communication route of the present embodiment. It is to be noted that the present automatic selecting apparatus can be applied to the three wireless communication systems of two packet exchanges of a first and a second packet exchange and the line exchange.

That is, the present apparatus has an antenna 31 for first packet exchange, a switch 34 for first packet exchange and a communication control section 37 for first packet exchange as well as an antenna 33 for line exchange, a switch 36 for line exchange and a communication control section 39 for line exchange. This first packet exchange is constructed similarly to the antenna 21 for packet exchange, the switch 23 for packet exchange and the communication control section 25 for packet exchange and this line exchange is constructed similarly to the antenna 22 for line exchange, the switch 24 for line exchange and the communication control section 26 for line exchange shown in FIG. 4.

In addition, the present apparatus further includes an antenna 32 for second packet exchange, and this antenna 32 is connected via a switch 35 for second packet exchange to a communication control section 38 for second packet exchange.

A communication route selection control section 40 receives signals from the antennas 31 through 33 for each communication route to obtain the electric field intensity of each wireless communication route. Then, referring to the user's communication scheme and communication information stored in a communication scheme storing section 41 and a communication charge system stored in a communication charge system storing section 44, the control section decides the wireless communication route to be used. Subsequently, either one of the switches 34–36 for first and second packet exchange and for line exchange is turned on according to the above decision.

In the present case, the communication scheme storing section 41 stores a table of a correlation between the signal-to-noise ratio of a reception signal and a data communication error rate of each wireless communication route as shown in FIG. 8 and communication conditions of each wireless communication route described as follows as the above communication information. The communication charge system storing section 44 stores the communication charge systems for a first packet exchange as shown in FIG. 9, the communication charge system for second packet exchange as shown in FIG. 10 and the communication charge system for line exchange as shown in FIG. 11.

When one of the communication control sections 37–39 for first and second packet exchange and for line exchange is connected to the wireless communication route to be used in a manner as described above, the communication control section executes data communication by way of the corresponding wireless communication route and transmits the communication result obtained through the above operation to a portable terminal information processing section 42.

The portable terminal information processing section 42 stores and updates the communication information and the communication scheme for the communication scheme storing section 41 based on the communication result from the communication control section that has executed the data communication among the communication control sections 37–39 for first and second packet exchange and for line exchange also based on the user's communication scheme from an input section 43.

The applicable wireless communication systems of the present embodiment are the three wireless communication routes of the first packet exchange, the second packet exchange and the line exchange. In the present case, the position of the base station as well as the communication conditions vary according to each wireless communication route.

Therefore, according to the present embodiment, the communication information of the correlation between the signal-to-noise ratio of the reception signal and the data communication error rate of each wireless communication route and communication conditions such as a data communication speed (bits/sec), a packet size and an error correction system of each wireless communication route are stored in the communication scheme storing section 41. Further, the communication charge system of each wireless communication route is stored in the communication charge system storing section 44. Then, the communication route selection control section 40 measures the electric field intensities of the packet exchange and the line exchange at the time of starting the data communication, estimates the charge for communication as follows referring to the above communication conditions based on the result of measurement, and according to the result of measurement decides the wireless communication route by way of which the data communication is executed.

It is assumed that the communication by the first packet exchange system, the second packet exchange system and the line exchange system is executed at a rate of 9600 bps (bits/sec). It is further assumed that the signal-to-noise ratio of the reception signal at a specified point of time is 2 dB according to the first packet exchange, 7 dB according to the second packet exchange and 6 dB according to the line exchange. Then, from FIG. 8, the data communication error rate estimated at the point of time is "0.07" according to the first packet exchange, "0.009" according to the second packet exchange and "0.008" according to the line exchange.

It is postulated that data to the total amount of 100k bytes is communicated at 23:30 midnight.

Then, taking a data communication error rate of 0.008 into account according to the line exchange, the communication data amounts to 100.08k bytes, and therefore, the time of communication is estimated to be 84 seconds. Then, assuming that the communication area is within 160 km outside the line exchange service providing area, the charge for communication is estimated to be 52.5 yens from FIG. 11.

According to the first packet exchange, it is postulated that the packet size is 16 bytes and any packet in which data error occurs is to be retransmitted. Then, the number of packets to be communicated is 6250. However, the packet is lost at a data communication error rate of 0.07, and therefore, the number of packets to be actually communicated is about 6688. Therefore, the time of communication is estimated to be about 88.8 seconds. Then, assuming that the communication area is beyond 100 km from the base station, the charge for communication is estimated to be 642 yens from FIG. 9.

According to the second packet exchange, it is postulated that the packet size is 32 bytes and any packet in which data error occurs is to be retransmitted. Then, the number of packets to be communicated is 3125. However, the packet is lost at a data communication error rate of 0.009, and therefore, the number of packets to be actually communicated is about 3154. Therefore, the time of communication is estimated to be 84 seconds. Then, assuming that data of not less than 500k bytes has been already communicated according to the second packet exchange system in this month, the charge for communication is estimated to be 808 yens from FIG. 10.

According to the above results, the communication route selection control section 40 decides that the charge for communication by the line exchange is least expensive. Therefore, the switch 36 for line exchange is turned on.

FIG. 7 is a flowchart of an automatic communication route selecting operation to be executed under the control of communication route selection control section 40, the communication control sections 37 and 38 for first and second packet exchange, the communication control section 39 for line exchange and the portable terminal information processing section 42. The automatic communication route selecting operation of the present embodiment will be described below with reference to FIG. 7.

In step S21, the communication route selection control section 40 obtains the electric field intensities of the first packet exchange, the second packet exchange and the line exchange based on signals from the antennas 31–33 for first and second packet exchange and for line exchange.

In step S22, the communication route selection control section 40 investigates the communication information of the correlation between the signal-to-noise ratio of a reception signal and the data communication error rate concerning both the packet exchanges and the line exchange stored in the communication scheme storing section 41, the communication conditions and the like. Then, the data communication error rate is obtained for each of the first packet exchange, the second packet exchange and the line exchange, and based on the data communication error rate, the actual communication data amount and the actual time of communication based thereon are estimated.

In step S23, the communication route selection control section 40 refers to the communication route selecting scheme that has been inputted by the user from the input section 43 and stored in the communication scheme storing section 41.

In step S24, the communication route selection control section 40 decides whether or not the communication route selecting scheme stored in the communication scheme storing section 41 is "to use the wireless communication route costing the least expensive charge for communication". When the scheme is "to use the wireless communication route costing the least expensive charge for communication" as a result, the program flow proceeds to step S25. Otherwise, the automatic communication route selecting operation is completed.

In step S25, the communication route selection control section 40 calculates the charge for communication of each wireless communication route in a manner as described above based on the communication data amount and the time of communication that have been estimated in step S22 referring to the communication charge system stored in the communication charge system storing section 44 according to the designated communication route selecting scheme "to use the wireless communication route costing the least expensive charge for communication".

In step S26, the communication route selection control section 40 decides that the calculated wireless communication route costing the least expensive charge for communication out of the first packet exchange, the second packet exchange and the line exchange is the wireless communication route to be used.

Then, the switch corresponding to the wireless communication route to be used out of the switches 34–36 for first and second packet exchange and for line exchange is turned on.

In step S27, data communication is executed by way of the wireless communication route decided in step S26 by the communication control section out of those 37, 38, 39 connected to the switch turned on.

In step S28, the portable terminal information processing section 42 corrects the communication information of the correlation between the signal-to-noise ratio of the reception signal and the data communication error rate and the like stored in the communication scheme storing section 41 based on the communication result of the number of retransmission packets and the like transmitted from the communication control section out of those 37, 38, 39 which is executing the data communication.

Subsequently, the automatic communication route selecting operation is completed.

Thus, according to the present embodiment, the communication scheme storing section 41 stores the communication information of the communication route selecting scheme designated from the input section 43, the correlation between the signal-to-noise ratio of the reception signal and the data communication error rate of each of the first packet exchange, the second packet exchange and the line exchange, the communication conditions and the like. Further, the communication charge system storing section 44 stores the communication charge system of each wireless communication route.

Then, the communication route selection control section 40 estimates the charges for communication of the first packet exchange, the second packet exchange and the line exchange referring to the correlation between the signal-to-noise ratio of the reception signal and the data communication error rate, the communication conditions and the communication charge system based on the electric field intensities from antennas 31 through 33 for each wireless communication route according to the communication route selecting scheme "to use the wireless communication route costing the least expensive charge for communication" stored in the communication scheme storing section 41, and decides that the wireless communication route costing the least expensive charge for communication out of the first packet exchange, the second packet exchange and the line exchange is the optimum wireless communication route. Then, data communication is executed by way of the wireless communication route corresponding to the communication control section out of those 37, 38, 39 corresponding to the optimum wireless communication route.

Therefore, by watching the communication route conditions of both the packet exchanges and the line exchange by the electric field intensity, when the communication route selecting scheme designated by the user is "to use the wireless communication route costing the least expensive charge for communication", the charge for communication is estimated to allow the optimum wireless communication route to be automatically selected.

The communication scheme storing section 41 for storing the communication route selecting scheme and the communication information, and the communication charge system storing section 44 for storing the communication charge system are separately provided in the above embodiment, however, it is also acceptable to integrate both the sections into one storing section.

The above embodiment has exemplified the packet exchange whose error correction system is the "system of retransmitting any packet in which a data communication error occurs". In the case of a packet exchange whose error correction system is the "system of correcting any packet in which a data communication error occurs at the receiving end", it is proper to calculate the time of communication as follows.

That is, for example, a total number of received packets and the number of corrected packets are calculated at the receiving end, the data communication error rate is calculated based on both the count values, and the resulting rate is transmitted as a communication result to the transmitting end. Then, the charge for communication is calculated for each communication route based on the communication error rate by the portable terminal information processing section at the transmitting end.

The automatic selecting apparatus for an optimum wireless communication route of the present invention will be further described below based on its concrete example different from the above embodiments.

Figure 12:
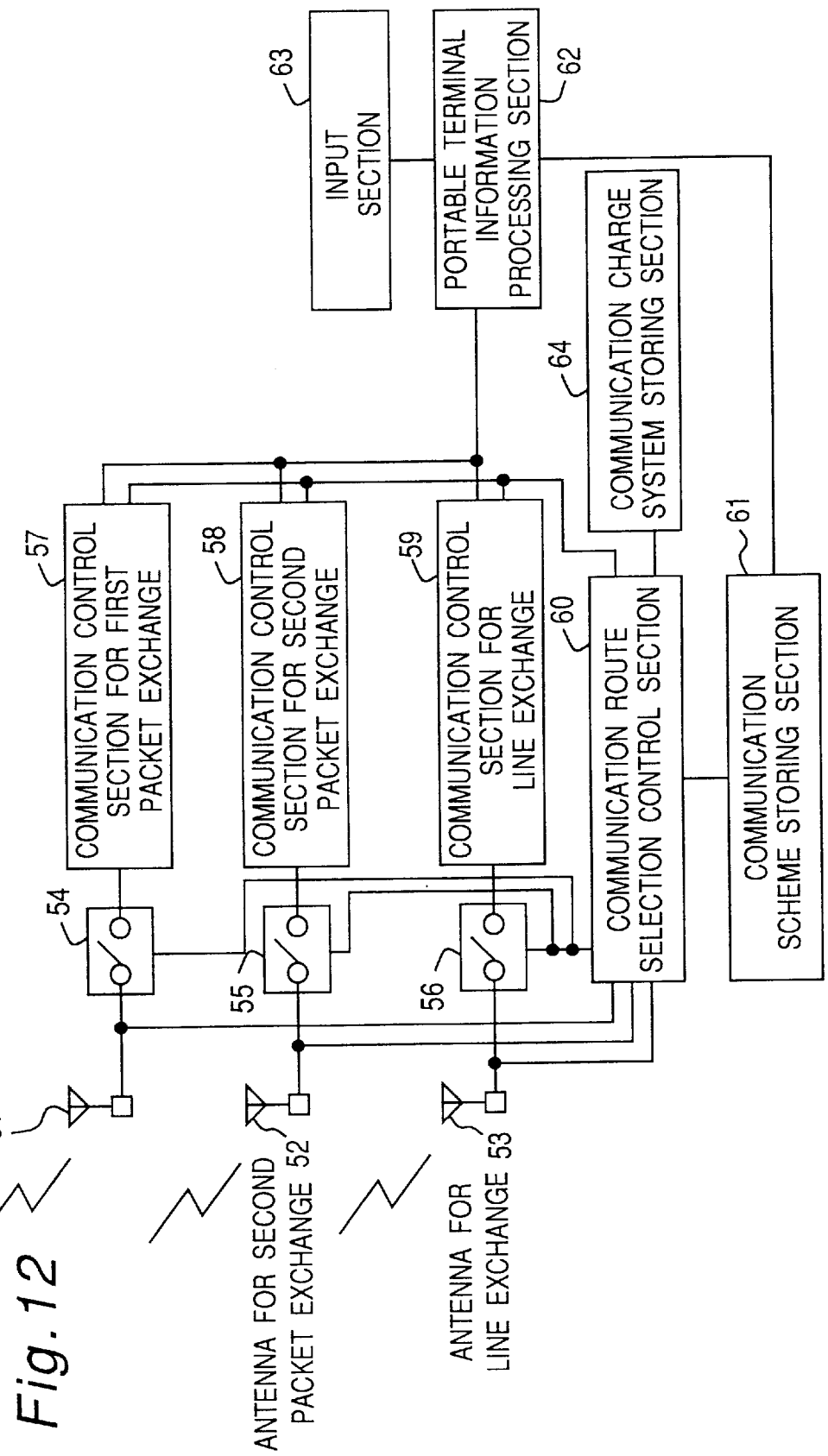
FIG. 12 is a block diagram showing a concrete example different from the ones shown in FIGS. 4 and 6.

FIG. 12 is a block diagram of an automatic selecting apparatus for an optimum wireless communication route of the present embodiment. Antennas 51, 52, 53 for first, second packet exchange and for line exchange, switches 54, 55, 56 for first and second packet exchange and for line exchange, communication control sections 57, 58, 59 for first, second packet exchange and for line exchange, a portable terminal information processing section 62 and an input section 63 of the present apparatus have constructions and operations similar to those of the antennas 31, 32, 33 for first, second packet exchange and for line exchange, switches 34, 35, 36, for first, second packet exchange and for line exchange, the communication control sections 37, 38, 39 for first, second packet exchange and for line exchange, the portable terminal information processing section 42 and the input section 43 of the apparatus shown in FIG. 6.

A communication route selection control section 60 of the present embodiment decides the wireless communication route to be used as follows according to the user's communication scheme "to use the wireless communication route requiring the shortest time of communication" that has been inputted from the input section 63 by the user and stored in the communication scheme storing section 61.

In the present case, it is postulated that the communication conditions of the first packet exchange, the second packet exchange and the line exchange stored in the communication scheme storing section 61 are quite the same as those of the previous embodiment as follows.

The communication is executed at the rate of 9600 bps (bits/sec) in each wireless communication system.

The first packet exchange has a packet size of 16 bytes and any packet in which a data communication error occurs is retransmitted.

The second packet exchange has a packet size of 32 bytes and any packet in which a data communication error occurs is retransmitted.

It is further postulated that the data communication conditions are quite the same as those of the previous embodiment as follows.

The signal-to-noise ratio of the reception signal at the time of data communication is:
2 dB in the case of the first packet exchange,
7 dB in the case of the second packet exchange, and
6 dB in the case of line exchange.

The total amount of look bytes is communicated at 23:30 midnight.

The communication area is within 160 km outside the line exchange service providing area.

The communication area is beyond 100 km from the base station of the first packet exchange.

Data of not less than 500k bytes has been already communicated according to the second packet exchange system in this month.

First, the communication route selection control section 60 obtains the data communication error rate for each wireless communication route from the signal-to-noise ratio of the reception signal at the time of data communication similarly to the previous embodiment as follows:
0.07 in the case of the first packet exchange;
0.009 in the case of the second packet exchange; and
0.008 in the case of the line exchange.

Then, similarly to the previous embodiment, the time of communication is estimated from the above obtained data communication error rate as follows:
88.8 seconds in the case of the first packet exchange;
84 seconds in the case of the second packet exchange; and
84 seconds in the case of the line exchange.

Since the user's communication scheme is "to use the wireless communication route requiring the shortest time of communication" as described above, the communication route selection control section 60 decides that the wireless communication route estimated to require the shortest time of communication is the optimum wireless communication route.

However, when there is a plurality of wireless communication routes estimated to require the shortest time of communication as described above, it is decided that the route costing the less expensive charge for communication is the optimum wireless communication route. That is, in the present example, the charge for communication is calculated from the above estimated time of communication according to the second packet exchange and the line exchange similarly to the previous embodiment as follows:

808 yens in the case of the second packet exchange; and
52.5 yens in the case of the line exchange.

From the above results, the communication route selection control section 60 decides that the line exchange costing the less expensive charge for communication is the optimum wireless communication route and turns on the switch 56 for line exchange.

Figure 13:
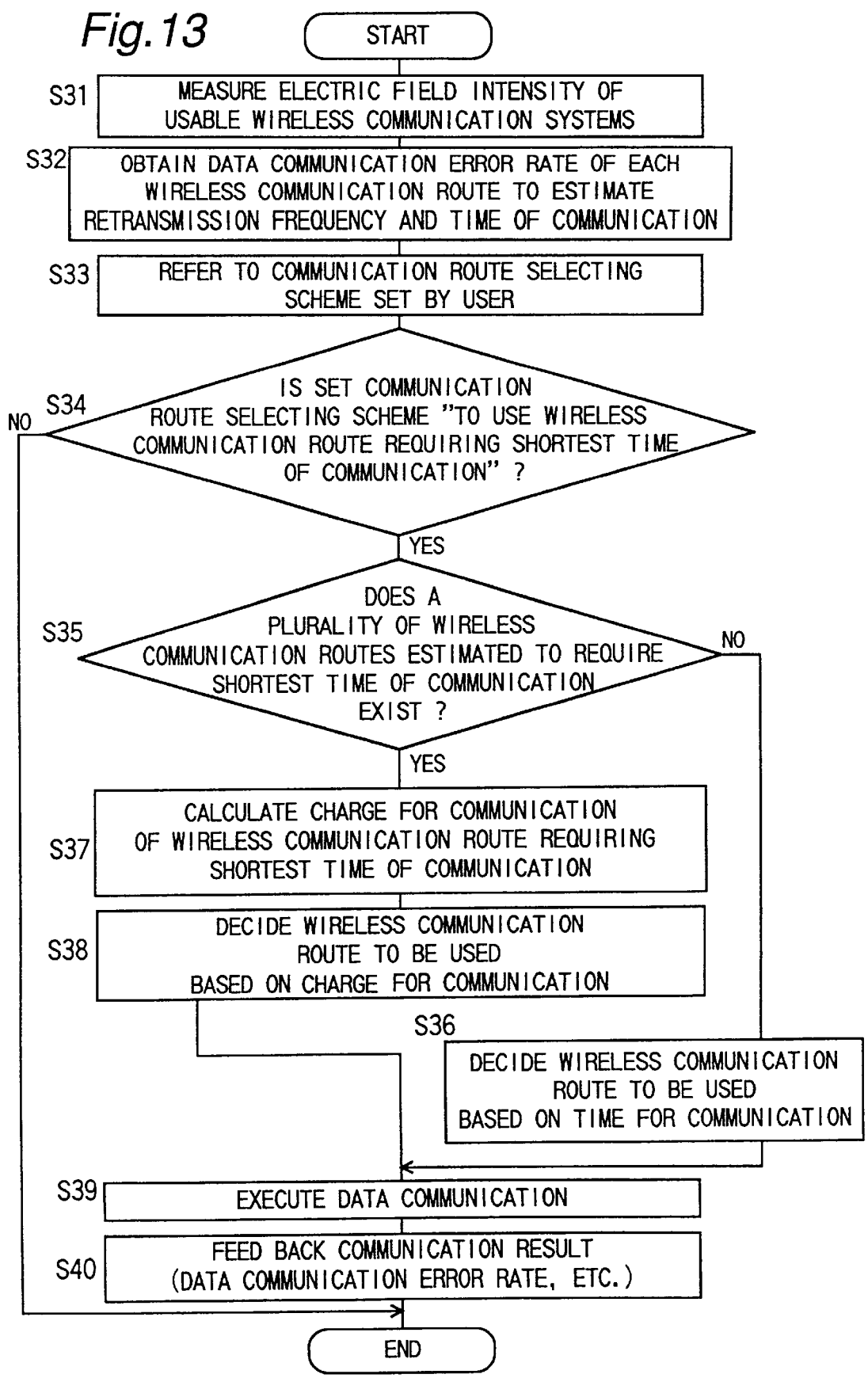
FIG. 13 is a flowchart of an automatic communication route selecting operation to be executed by a communication route selection control section, communication control sections for first and second packet exchange, a communication control section for line exchange and a portable terminal information processing section as shown in FIG. 12.

FIG. 13 is a flowchart of an automatic communication route selecting operation to be executed under the control of the communication route selection control section 60, the communication control sections 57, 58, 59 for first, second packet exchange and for line exchange and the portable terminal information processing section 62. The automatic communication route selecting operation of the present embodiment will be described below with reference to FIG. 13.

In steps S31 through S33, the electric field intensities of the first packet exchange, the second packet exchange and the line exchange are obtained, the data communication error rate is obtained for each wireless communication route, the data retransmission frequency and the time of communication are estimated, and the communication route selecting scheme designated by the user is referred to similarly to the steps S21 through S23 of the flowchart (FIG. 7) of the automatic communication route selecting operation of the previous embodiment.

In step S34, the communication route selection control section 60 decides whether or not the communication route selecting scheme stored in the communication scheme storing section 61 is "to use the wireless communication route requiring the shortest time of communication". When the scheme is "to use the wireless communication route requiring the shortest time of communication" as a result, the program flow proceeds to step S35. Otherwise, the automatic communication route selecting operation is completed.

In step S35, the communication route selection control section 60 decides whether or not there is existing a plurality of wireless communication routes that is estimated to be the route requiring the shortest time of communication based on the time of communication estimated in step S32. When a plurality of wireless communication routes exist as a result, the program flow proceeds to step S37. Otherwise, the program flow proceeds to step S36.

In step S36, the communication route selection control section 60 decides that the wireless communication route estimated to require the shortest time of communication among the first packet exchange, the second packet exchange and the line exchange is the wireless communication route to be used.

Then, the switch corresponding to the wireless communication route to be used among the switches 54, 55, 56 for first, second packet exchange and for line exchange is turned on, and thereafter the program flow proceeds to step S39.

In steps S37 through S40, the following processes are executed similarly to the steps S25 through S28 of the flowchart of the automatic communication route selecting operation shown in FIG. 7. That is, the charges for communication of the plurality of wireless communication routes estimated to require the shortest time of communication are calculated. Then it is decided that the wireless communication route costing the least expensive charge for communication is the wireless communication route to be used, and the switch for corresponding communication route is turned on. Then data communication is executed by the communication control section connected to the above switch turned on, and the communication information in the communication scheme storing section 61 is corrected based on the result of communication from the communication control section that is executing the data communication.

Subsequently, the automatic communication route selecting operation is completed.

Thus, according to the present embodiment, the communication scheme storing section 61 stores the communication information of the communication route selecting scheme designated from the input section 63, the correlation between the signal-to-noise ratio of the reception signal and the data communication error rate of each of the first packet exchange, the second packet exchange and the line exchange, the communication conditions and the like. Further, the communication charge system storing section 64 stores the communication charge system of each wireless communication route.

Then, the communication route selection control section 60 estimates the times of communication of the first packet exchange, the second packet exchange and the line exchange referring to the correlation between the signal-to-noise ratio of the reception signal and the error rate and the communication conditions based on the electric field intensities of the antennas 51 through 53 for each wireless communication route according to the communication route selecting scheme "to use the wireless communication route requiring the shortest time of communication" stored in the communication scheme storing section 61, and decides that the wireless communication route requiring the shortest time of communication among the first packet exchange, the second packet exchange and the line exchange is the optimum wireless communication route.

When a plurality of wireless communication routes requiring the shortest time of communication exist in the above case, the communication route selection control section 60 estimates the charges for communication of the plurality of wireless communication routes that require the shortest time of communication referring to the above communication charge system and decides that the wireless communication route which costs the least expensive charge for communication is the optimum wireless communication route.

Then, data communication is executed by the communication control section corresponding to the above decided wireless communication route among the communication control sections 57, 58, 59 for first and second packet exchange and for line exchange.

Therefore, by watching the communication route conditions of both the packet exchanges and the line exchange by the electric field intensity, when the communication route selecting scheme designated by the user is "to use the wireless communication route requiring the shortest time of communication", the time of communication is estimated to allow the optimum wireless communication route to be automatically selected.

It is also acceptable to implement the storing section for storing the communication route selecting scheme and the communication information and the storing section for storing the communication charge system by one storing section in the above embodiment.

The automatic selecting apparatus for an optimum wireless communication route of the present invention will be described further based on its concrete example different from the above embodiments.

Figure 14:
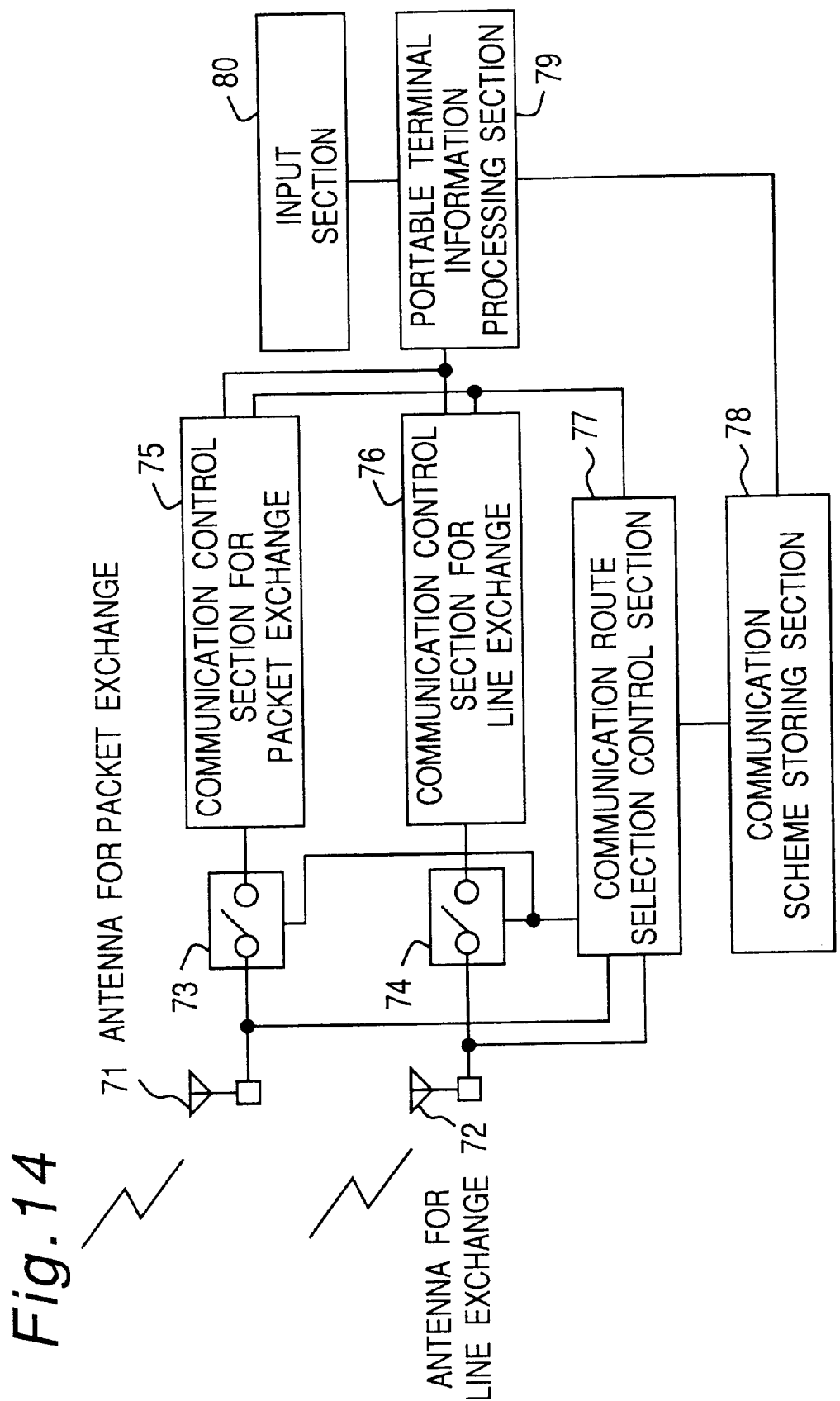
FIG. 14 is a block diagram showing a concrete example different from the ones shown in FIGS. 4, 6 and 12.

FIG. 14 is a block diagram of an automatic selecting apparatus for optimum wireless communication route of the present embodiment. An antenna 71 for packet exchange, an antenna 72 for line exchange, a switch 73 for packet exchange, a switch 74 for line exchange, a communication control section 75 for packet exchange, a communication control section 76 for line exchange, a communication route selection control section 77, a communication scheme storing section 78 and an input section 80 of the present apparatus have constructions and operations similar to those of the antennas 21, 22 for packet and line exchange, the switches 23, 24 for packet and line exchange, the communication control sections 25, 26 for packet and line exchange, the communication route selection control section 27, the communication scheme storing section 28 and the input section 30 of the apparatus shown in FIG. 4.

In the present embodiment, the data communication error rates of the packet exchange and the line exchange are estimated by means of a correlation between the electric field intensity and the data communication error rate obtained based on data measured preparatorily through an experiment, and the optimum wireless communication route is decided according to the result of estimation similarly to the apparatus shown in FIG. 4. However, the correlation between the electric field intensity and the data communication error rate varies depending on the communication conditions of each wireless communication route and the communication environment of the receiving station, and therefore, the correlation obtained through the experiment is not always optimum.

Therefore, a portable terminal information processing section 79 of the present embodiment corrects the correlation between the electric field intensity and the data communication error rate of each wireless communication route stored in the communication scheme storing section 78 based on the result of communication from the communication control section out of those 75, 76 for packet and line exchange that has executed the data communication in a manner as follows, while the section 79 also stores the user's communication route selecting scheme inputted from the input section 80 into the communication scheme storing section 78.

That is, in the case of the wireless communication according to the packet exchange, the portable terminal information processing section 79 calculates the data communication error rate by a ratio of the number of packets that have been requested to be retransmitted from the receiving end to the number of packets that have not been requested to be retransmitted. In contrast to the above, in the case of the wireless communication according to the line exchange, the communication control section 76 for line exchange divides data every several tens milliseconds to execute coding (framing), and transmits the coded data and data necessary for error correction (error correction data). Then, a decoding process is executed at the receiving end, and an error detection process is executed by means of the obtained error correction data, so that the number of data that has undergone the error correction and the number of data that has not undergone the error correction out of the above decoded data are transmitted as the above communication signal to the transmitting end. The portable terminal information processing section 79 at the transmitting end calculates the data communication error rate based on the result of communication received via the communication control section 76 for line exchange.

When the calculated data communication error rate is not conforming to the correlation of the corresponding wireless communication route stored in the communication scheme storing section 78, the corresponding correlation between the electric field intensity and the data communication error rate of the wireless communication route stored in the communication scheme storing section 78 is updated by the above calculated data communication error rate.

Figure 15:
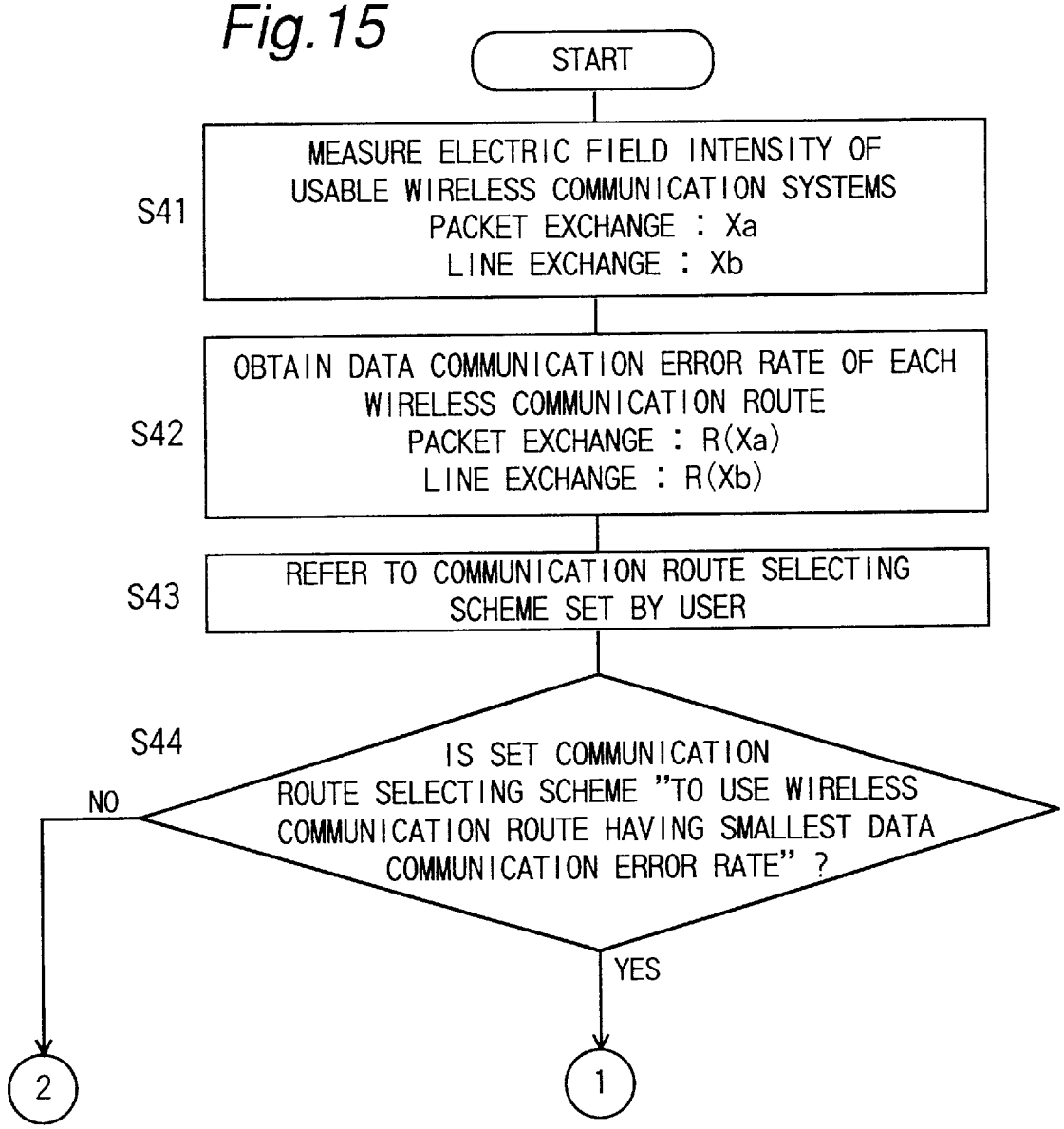
FIG. 15 is a flowchart of an automatic communication route selecting operation to be executed by a communication route selection control section, communication control sections for packet and line exchange and a portable terminal information processing section as shown in FIG. 14.
Figure 16:
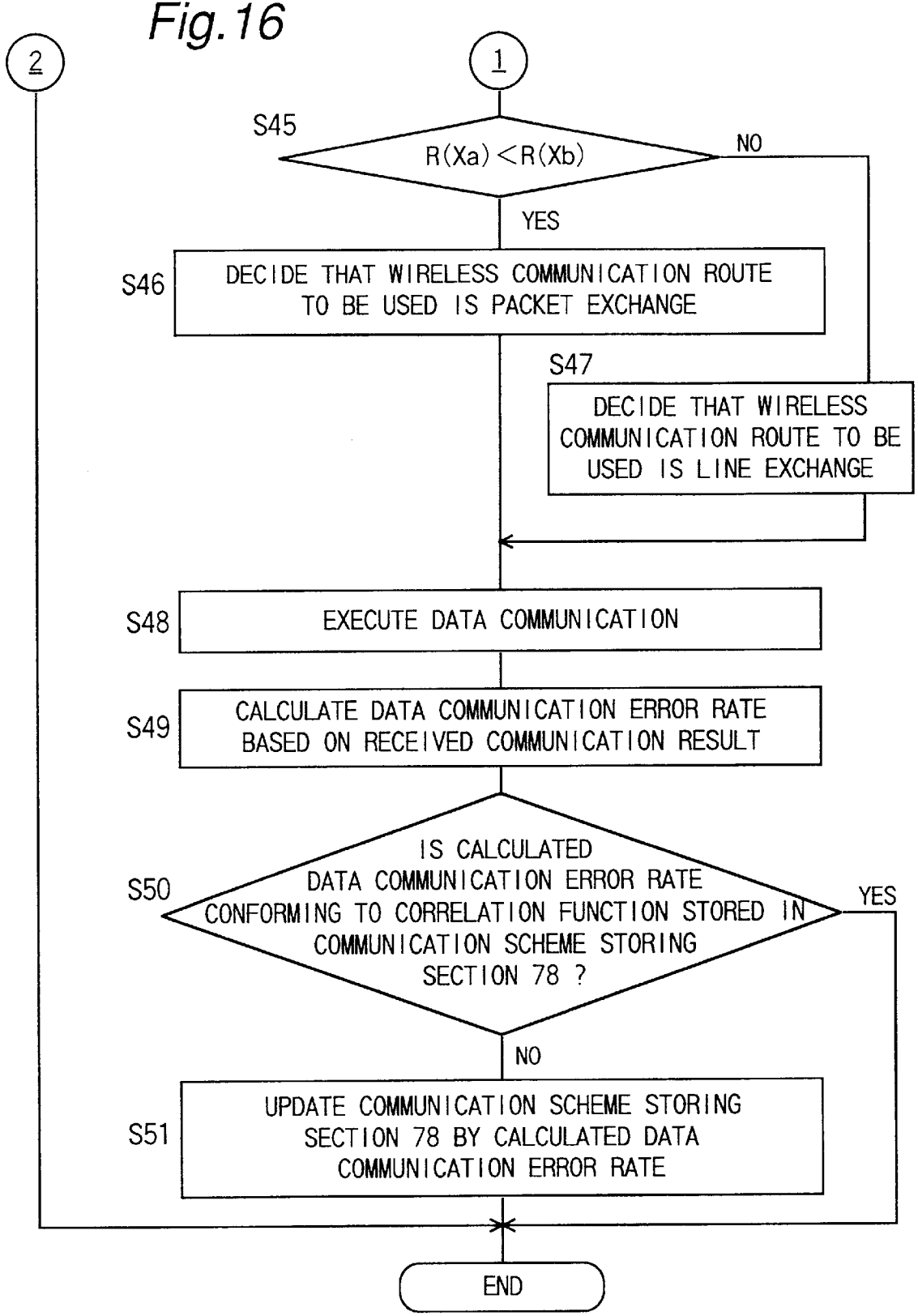
FIG. 16 is a flowchart of the automatic communication route selecting operation following FIG. 15.

FIGS. 15 and 16 are flowcharts of an automatic communication route selecting operation to be executed under the control of the communication route selection control section 77, the communication control sections 75, 76 for packet and line exchange and the portable terminal information processing section 79. The automatic communication route selecting operation of the present embodiment will be described below with reference to FIGS. 15 and 16.

In step S41, the communication route selection control section 77 measures the electric field intensities of the packet exchange and the line exchange based on signals from the antennas 71, 72 for packet and line exchange.

In the present case, it is postulated that the electric field intensity of the packet exchange is Xa and the electric field intensity of the line exchange is Xb.

In step S42, the communication route selection control section 77 obtains the data communication error rate of each of the packet and line exchange from the correlation between the electric field intensities of each of the packet and line exchange and the data communication error rate stored in the communication scheme storing section 78.

It is postulated here that the data communication error rate of the packet exchange is R(Xa) and the data communication error rate of the line exchange is R(Xb).

In step S43, the communication route selection control section 77 refers to the communication route selecting scheme that has been inputted by the user from the input section 80 and stored in the communication scheme storing section 78.

In step S44, the communication route selection control section 77 decides whether or not the communication route selecting scheme stored in the communication scheme storing section 78 is "to use the wireless communication route having the lowest data communication error rate". When the scheme is "to use the wireless communication route having the lowest data communication error rate" as a result, the program flow proceeds to step S45. Otherwise, the automatic communication route selecting operation is completed.

In step S45, the communication route selection control section 77 decides whether or not the data communication error rate obtained in step S42 satisfies a condition R(Xa)<R(Xb). When the above condition is satisfied, the program flow proceeds to step S46. When the above condition is not satisfied, the program flow proceeds to step S47.

In step S46, it is decided that the wireless communication route to be used is the packet exchange, and the switch 73 for packet exchange is turned on. Subsequently, the program flow proceeds to step S48.

In step S47, it is decided that the wireless communication route to be used is the line exchange, and the switch 74 for line exchange is turned on.

In step S48, data communication is executed by way of the wireless communication route decided in step S46 or S47 by the communication control section out of those 75, 76 for packet and line exchange connected to the switch turned on.

In step S49, the portable terminal information processing section 79 calculates the data communication error rate as above based on the result of communication of the number of retransmission packets transmitted from the communication control section that is executing the data communication out of those 75, 76 for packet and line exchange.

In step S50, the portable terminal information processing section 79 decides whether or not the data communication error rate calculated in step S49 is conforming to the correlation between the electric field intensity and the data communication error rate stored in the communication scheme storing section 78. When there is no conformity as a result, the program flow proceeds to step S51. When there is a conformity, the automatic communication route selecting operation is completed.

In step S51, the correlation between the electric field intensity and the data communication error rate stored in the communication scheme storing section 78 is updated by the data communication error rate calculated in step S49.

Subsequently, the automatic communication route selecting operation is completed.

Thus, according to the present embodiment, the communication scheme storing section 78 stores the communication route selecting scheme designated from the input section 80 and the communication information of the correlation between the electric field intensity and the data communication error rate of each of the packet and line exchange and the like. Then, the communication route selection control section 77 decides that one having the lower data communication error rate out of the packet and line exchange is the optimum wireless communication route referring to the correlation between the electric field intensity and the data communication error rate of each of the packet and line exchange stored in the communication scheme storing section 78 according to the communication route selecting scheme "to use the wireless communication route having the lowest data communication error rate" stored in the communication scheme storing section 78.

Then, the portable terminal information processing section 79 calculates the data communication error rate based on the result of communication from the communication control section out of those 75, 76 for packet and line exchange that has executed the data communication and updates the correlation between the electric field intensity and the data communication error rate stored in the communication scheme storing section 78.

Therefore, even when the correlation between the electric field intensity and the data communication error rate stored preparatorily in the communication scheme storing section 78 is not conforming to the communication environment, the automatic selection of the optimum wireless communication route can be achieved with high accuracy.

It is to be noted that the algorithm of the automatic communication route selecting operation of each of the above embodiments is not limited to the flowcharts shown in FIGS. 2, 5, 7, 13, 15 and 16.

Furthermore, it is also acceptable to construct the automatic selecting apparatus for an optimum wireless communication route of the present invention by combining several ones of the above embodiments. For example, by combining the automatic selecting apparatus for an optimum wireless communication route which can be applied to the two of the first and second packet exchange systems and the line exchange system and of which communication route selecting scheme is "to use the wireless communication route costing the least expensive charge for communication" as shown in FIG. 6 with the automatic selecting apparatus for an optimum wireless communication route having the function of correcting by an actual measurement value the correlation between the electric field intensity (signal-to-noise ratio of the reception signal) and the data communication error rate of each wireless communication route stored in the communication scheme storing section as shown in FIG. 14, an automatic selecting apparatus for an optimum wireless communication route having a higher function can be constructed.

Furthermore, the automatic selecting apparatuses for an optimum wireless communication route of the above embodiments can be each applied to one communication route selecting scheme. However, they can be each applied to a plurality of communication route selecting schemes to allow the range of application to be further widened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic selecting apparatus for selecting an optimum wireless communication route comprising:

communication control sections for executing data communication by way of wireless communication routes;

a communication information storing section or storing communication information concerning the wireless communication routes;

a scheme designating section for designating a communication route selecting scheme;

a scheme storing section for storing a communication route selecting scheme designated by said scheme designating section; and a communication route selection control section for selecting an optimum wireless communication route by referring to the communication information of the wireless communication routes stored in said communication information storing section based on the designated communication route selecting scheme stored in said scheme storing section to thereby operate a communication control section corresponding to the selected optimum wireless communication route.

2. The automatic selecting apparatus for selecting an optimum wireless communication route as claimed in claim 1, wherein said communication information storing section stores a correlation between reception signal intensity information and a data communication error rate as one of the communication information, said communication route selection control section comprising:

intensity information detecting means for detecting reception signal intensity information of each wireless communication route based on a reception signal from each wireless communication route; and error rate calculating means for obtaining a data communication error rate of each wireless communication route based on the reception signal intensity information of each wireless communication route detected by said intensity information detecting means and the stored correlation, wherein when the designated communication route selecting scheme stored in said scheme storing section is "to use a wireless communication route having a smallest data communication error rate", the automatic selecting apparatus selects the wireless communication route having a smallest data communication error rate as obtained by said error rate calculating means as the optimum wireless communication route.

3. The automatic selecting apparatus for selecting an optimum wireless communication route as claimed in claim 1, wherein said communication information storing section stores a correlation between reception signal intensity information and a data communication error rate as one of the communication information, said communication route selection control section comprising:

intensity information detecting means for detecting reception signal intensity information of each wireless communication route based on a reception signal from each wireless communication route; and communication time estimating means for estimating an actual time of communication including error correction of each wireless communication route by referring to the communication information using the data communication error rate of each wireless communication route based on the reception signal intensity information of each wireless communication route detected by said intensity information detecting means and the stored correlation, wherein when the designated communication route selecting scheme stored in said scheme storing section is "to use a wireless communication route requiring a shortest time of communication", the automatic selecting apparatus selects the wireless communication route requiring a shortest time of communication as estimated by said communication time estimating means as the optimum wireless communication route.

4. The automatic selecting apparatus for selecting an optimum wireless communication route as claimed in claim 1, wherein said communication information storing section stores a correlation between reception signal intensity information and a data communication error rate and a charge system of each wireless communication system as the communication information, said communication route selection control section comprising:

intensity information detecting means for detecting reception signal intensity information of each wireless communication route based on a reception signal from each wireless communication route;

estimating means for estimating either one of an actual communication data amount and an actual time of communication including error correction of each wireless communication route by referring to the communication information using the data communication error rate of each wireless communication route based on the reception signal intensity information of each wireless communication route detected by said intensity information detecting means and the stored correlation; and communication charge calculating means for calculating a charge for communication of each wireless communication route based on the actual communication data amount or the actual time of communication estimated by said estimating means and the stored charge system, wherein when the designated communication route selecting scheme stored in said scheme storing section is "to use a wireless communication route costing a least expensive charge for communication", the automatic selecting apparatus selects the wireless communication route costing a least expensive charge for communication as calculated by said communication charge calculating means as the optimum wireless communication route.

5. The automatic s electing apparatus for selecting an optimum wireless communication route as claimed in claim 2, a further comprising:

an information processing section for obtaining an actual data communication error rate of a wireless communication route that has executed data communication based on a communication result from a communication control section that has executed data communication, and updating the correlation between the reception signal intensity information and the data communication error rate stored in said communication information storing section according to the obtained actual data communication error rate.

6. The automatic selecting apparatus for selecting an optimum wireless communication route as claimed in claim 3, further comprising:

an information processing section for obtaining an actual data communication error rate of a wireless communication route that has executed data communication based on a communication result from a communication control section that has executed data communication, and updating the correlation between the reception signal intensity information and the data communication error rate stored in said communication information storing section according to the obtained actual data communication error rate.

7. The automatic selecting apparatus for selecting an optimum wireless communication route as claimed in claim 4, further comprising:

an information processing section for obtaining an actual data communication error rate of a wireless communication route that has executed data communication based on a communication result from a communication control section that has executed data communication, and updating the correlation between the reception signal intensity information and the data communication error rate stored in said communication information storing section according to the obtained actual data communication error rate.

8. A method of automatically selecting an optimum wireless communication route comprising the steps of:

storing communication information characteristic of each wireless communication route in a first memory;

storing a designated communication route selecting scheme selected from a plurality of communication route selecting schemes in a second memory; and selecting an optimum wireless communication route in accordance with the stored communication information of the wireless communication routes based on the stored designated communication route selecting scheme.

9. The method of automatically selecting an optimum wireless communication route of claim 8, wherein the communication information includes a correlation between reception signal intensity and data communication error rate, said step of selecting comprising:

determining reception signal intensity of each wireless communication route based on a reception signal received over each wireless communication route;

obtaining a data communication error rate of each wireless communication route based on the determined reception signal intensities of each wireless communication route and the correlation; and selecting a wireless communication route having a smallest data communication error rate as the optimum wireless communication route based on the obtained data communication error rates when the stored designated communication route selecting scheme requires a wireless communication route having a smallest data communication error rate.

10. The method of automatically selecting an optimum wireless communication route of claim 9, further comprising:

obtaining an actual data communication error rate of a wireless communication route over which data communication has been executed based on the executed data communication; and updating the correlation between the reception signal intensity and the data communication error rate in accordance with the obtained actual data communication error rate.

11. The method of automatically selecting an optimum wireless communication route of claim 8, wherein the communication information includes a correlation between reception signal intensity and data communication error rate, said step of selecting comprising:

determining reception signal intensity of each wireless communication route based on a reception signal received over each wireless communication route;

estimating an actual time of communication including error correction of each wireless communication route in accordance with the data communication error rate of each wireless communication route based on the determined reception signal intensity of each wireless communication route and the correlation; and selecting a wireless communication route requiring a shortest time of communication as the optimum wireless communication route based on the estimated actual times of communication when the stored designated communication route selecting scheme requires a wireless communication route having a shortest time of communication.

12. The method of automatically selecting an optimum wireless communication route of claim 11, further comprising:

obtaining an actual data communication error rate of a wireless communication route over which data communication has been executed based on the executed data communication; and updating the correlation between the reception signal intensity and the data communication error rate in accordance with the obtained actual data communication error rate.

13. The method of automatically selecting an optimum wireless communication route of claim 8, wherein the communication information includes a correlation between reception signal intensity and data communication error rate and a charge system of each wireless communication system, said step of selecting comprising:

determining reception signal intensity of each wireless communication route based on a reception signal received over each wireless communication route;

estimating either one of an actual communication data amount and an actual time of communication including error correction of each wireless communication route in accordance with the data communication error rate of each wireless communication route based on the determined reception signal intensity of each wireless communication route and the correlation;

calculating a charge for communication of each wireless communication route based on the estimated actual communication data amount or the estimated actual time of communication and the charge system; and selecting a wireless communication route costing a least expensive charge for communication as the optimum wireless communication route based on the calculated charges for communication when the stored designated communication route selecting scheme requires a wireless communication route costing a least expensive charge for communication.

14. The method of automatically selecting an optimum wireless communication route of claim 13, further comprising:

obtaining an actual data communication error rate of a wireless communication route over which data communication has been executed based on the executed data communication; and updating the correlation between the reception signal intensity and the data communication error rate in accordance with the obtained actual data communication error rate.

15. An automatic selecting apparatus for selecting an optimum wireless communication route comprising:

a plurality of communication control sections that execute data communication over respective wireless communication routes;

a selector that designates one of a plurality of communication route selecting schemes; and a controller that selects one of the wireless communication routes as an optimum wireless communication route based on the designated communication route selecting scheme and that directs the respective communication control section to execute wireless communication over the optimum wireless communication route.

16. The automatic selecting apparatus of claim 15, wherein said controller detects reception signal intensity of each wireless communication route, determines data communication error rate of each wireless communication route based on the detected reception signal intensity and selects one of the wireless communication routes as the optimum wireless communication route in accordance with the determined data communication error rates and the designated communication route selecting scheme.

17. The automatic selecting apparatus of claim 15, wherein the designated communication route selecting means requires selection of a wireless communication route having a smallest data communication error rate as the optimum wireless communication route.

18. The automatic selecting apparatus of claim 15, wherein the designated communication route selecting means requires selection of a wireless communication route requiring a shortest time of communication as the optimum wireless communication route.

19. The automatic selecting apparatus of claim 15, wherein the designated communication route selecting means requires selection of a wireless communication route costing a least expensive charge for communication as the optimum wireless communication route.

20. An automatic selecting apparatus for selecting an optimum wireless communication route comprising:

a plurality of communication means for executing data communication over respective wireless communication routes;

selection means for designating one of a plurality of communication route selecting schemes; and control means for selecting one of the wireless communication routes as an optimum communication route based on the designated communication route selecting scheme and for directing the respective communication means to execute wireless communication over the optimum wireless communication route.

* * * * *